UNITED STATES PATENT OFFICE.

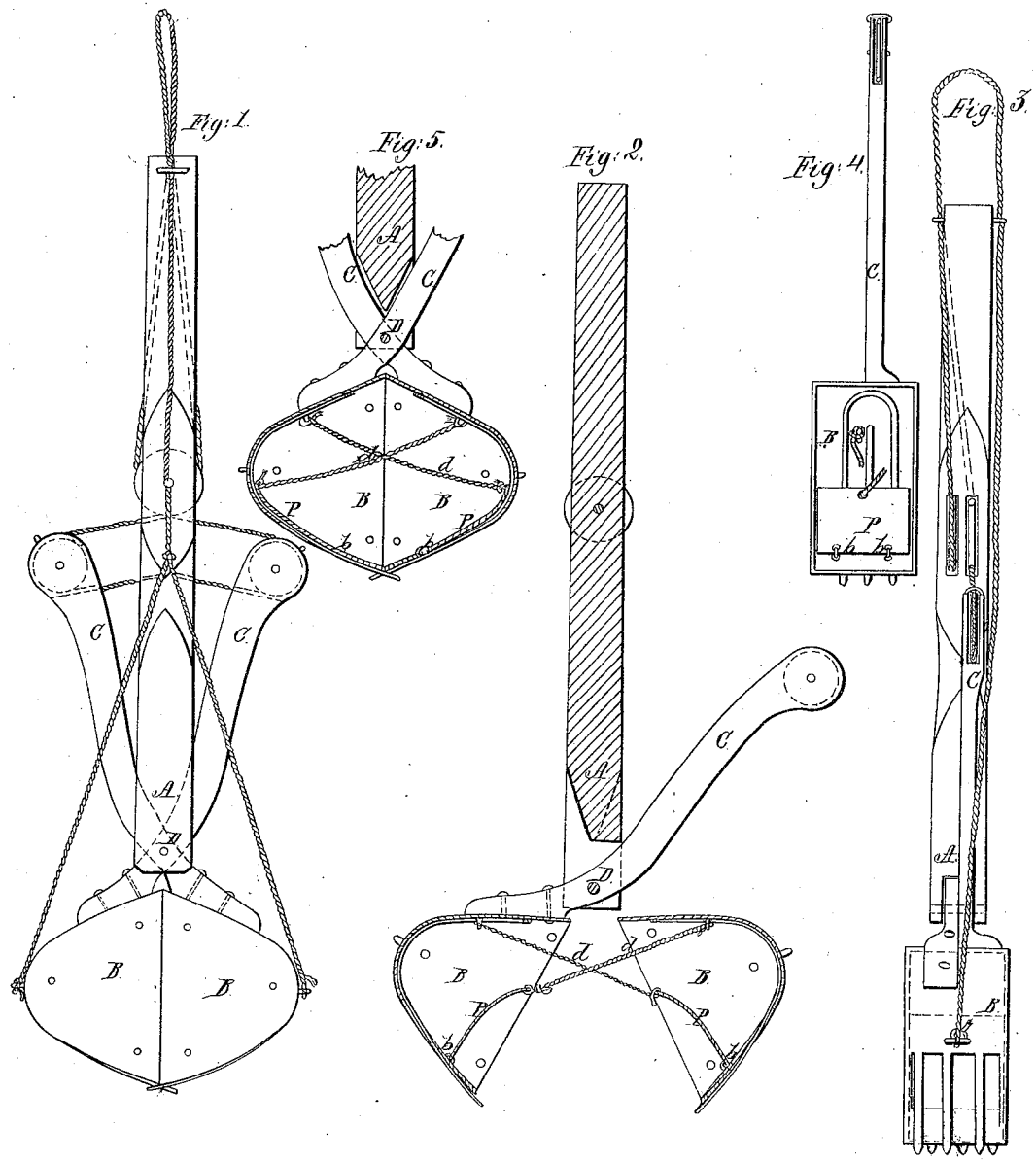

JOHN TAGGART, OF ROXBURY, MASSACHUSETTS.

EXCAVATING-SCOOP.

Specification of Letters Patent No. 14,933, dated May 20, 1856.

*To all whom it may concern:*

Be it known that I, JOHN TAGGART, of Roxbury, in the county of Norfolk and State of Massachusetts, have invented an Improvement in Scoops for Excavating or Dredging Machines; and I do hereby declare the same is fully described and represented in the following specification and the accompanying drawings, of which—

Figure 1, is a side elevation of a pair of scoops having my improvement applied to them. Fig. 2, is a central, vertical and longitudinal section of them. Fig. 3, is an edge view of the same. Fig. 4, a view of one of the scoops, taken so as to show its mouth, and the discharger within the scoop, the said discharger being hereinafter described.

On the fourth day of July, A. D. 1854, Letters Patent of the United States, were granted on an improved machine for excavating earth, the same having been invented by me.

My present invention consists in an improvement on the excavating scoops as described in the specification of the said patent; the peculiar kind of scoops therein exhibited being duly shown with a portion of their forked boom in the drawings hereinbefore mentioned, wherein A, represents the forked boom, while B, B, denote the scoops attached respectively to levers, C, C, whose common fulcrum, D, is at the lower end of said boom. In the practical working of a pair of scoops of this kind, it has been found that the mud, clay or earth while being seized by them often will become very firmly packed or condensed in them and to such an extent as to render it very difficult to remove it from them. In order to obviate this inconvenience, I employ within each scoop or combine with it what may be termed an earth discharger, the same consisting of a flap, or plate P, (or the equivalent therefor) arranged within each, scoop as seen in Figs. 2, and 4, and hinged at its lower end to the inner surface of the scoop and at or near the lower part or prong of the scoop or at, *b, b*, as seen in the drawings.

To the top or upper part of each of these dischargers, I attach one end of a chain, or rope, *d*, and I affix the other end of the said rope or chain, to the scoop containing the other discharger and this in such manner, that when both of the said scoops are closed together, the two dischargers may lie close against the bottoms of the scoops as represented in Fig. 5, which is a sectional view of the scoops as placed together; also so that the act of opening the scoops or drawing them asunder, shall cause the dischargers to be drawn or pulled off the bottoms of the scoops, and toward their mouths in such manner as to force out of the scoops any earthy contents that may be therein. Dischargers arranged within and connected with a pair of scoops in the above described improved manner are operated by the scoops and the earth, during the act of opening and closing the scoops and thus they are made to expel the contents of the scoops, without any care or attention of the workmen, who may be attending or conducting the machine.

What I claim as my invention and improvement is—

Applying one of two dischargers, within a pair of scoops substantially as specified and so as to operate therewith or be operated thereby in manner and for the purpose essentially as herein before explained.

In testimony whereof, I have hereunto set my signature, this sixth day of March A. D. 1856.

JOHN TAGGART.

Witnesses:
R. H. EDDY,
F. P. HALE, Jr.